United States Patent
Panchal et al.

(10) Patent No.: US 9,532,392 B2
(45) Date of Patent: Dec. 27, 2016

(54) COMMUNICATING VIA MULTIPLE COMMUNICATION LAYERS PROVIDED BY MULTIPLE WIRELESS NETWORK DEVICES

(71) Applicant: Verizon Patent and Licensing Inc., Basking Ridge, NJ (US)

(72) Inventors: Jignesh S Panchal, Somerset, NJ (US); Raafat Edward Kamel, Little Falls, NJ (US); Lalit R Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 218 days.

(21) Appl. No.: 13/912,932

(22) Filed: Jun. 7, 2013

(65) Prior Publication Data

US 2014/0362777 A1   Dec. 11, 2014

(51) Int. Cl.
*H04W 76/02* (2009.01)
*H04W 72/00* (2009.01)

(52) U.S. Cl.
CPC ........... *H04W 76/025* (2013.01); *H04W 72/00* (2013.01)

(58) Field of Classification Search
None
See application file for complete search history.

(56) References Cited

U.S. PATENT DOCUMENTS

| | | | |
|---|---|---|---|
| 2011/0103309 A1* | 5/2011 | Wang et al. | 370/328 |
| 2012/0071168 A1* | 3/2012 | Tomici et al. | 455/445 |
| 2012/0188949 A1* | 7/2012 | Salkintzis | H04L 45/308 370/329 |
| 2013/0155903 A1* | 6/2013 | Bi et al. | 370/255 |
| 2013/0272221 A1* | 10/2013 | Hoehne et al. | 370/329 |
| 2013/0322371 A1* | 12/2013 | Prakash et al. | 370/329 |
| 2014/0153504 A1* | 6/2014 | Wang | H04W 28/14 370/329 |

\* cited by examiner

*Primary Examiner* — Awet Haile
*Assistant Examiner* — Kent Krueger

(57) ABSTRACT

One or more devices may receive, from a user device via a first communication layer associated with a first network device, a request to add a second communication layer associated with a second network device; generate an instruction, based on receiving the request, to aggregate first data flow and the second data flow, to be provided via the first and second communication layers; and provide, to the second network device and based on generating the instruction, a response to indicate that the one or more devices are prepared to aggregate the first and second data flows. The response may include an instruction to direct the second network device to establish a simultaneous connection with the user device while the user device is connected to the first network device and to establish the connection with the user device via the second communication layer.

20 Claims, 7 Drawing Sheets

COMMUNICATING VIA MULTIPLE COMMUNICATION LAYERS PROVIDED BY MULTIPLE WIRELESS NETWORK DEVICES

BACKGROUND

Network devices are sometimes used to transmit/receive data flows (e.g., data packets associated with a communication) to/from user devices. Network devices sometimes provide a particular network resource in order to transmit the data flows via communication layers. A network device sometimes reduces the network resources to reduce network load. When insufficient network resources are provided (e.g., as a result of high network load caused high demand of network resources), the data flows may not be transmitted properly, thereby causing transmission performance problems. When providing greater network resources than the data flow may need for transmission, network load may be unnecessarily increased.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may permit a user device to communicate via multiple communication layers (e.g., provided by multiple network devices). For example, the user device may simultaneously connect to multiple network devices such that the multiple network devices may transmit, via respective communication layers, data flows to/from the user device. In some implementations, the user device may connect to the multiple network devices when the network devices are spatially separated (e.g., separated by a threshold geographic distance). In some implementations, the multiple network devices may provide particular services (e.g., network resources) in order to transmit data flows without providing excess network resources (e.g., bearers that provided greater than a threshold bit rate, less than a threshold latency, less than a threshold jitter, etc.) that may not be needed for transmission.

Figure 1:
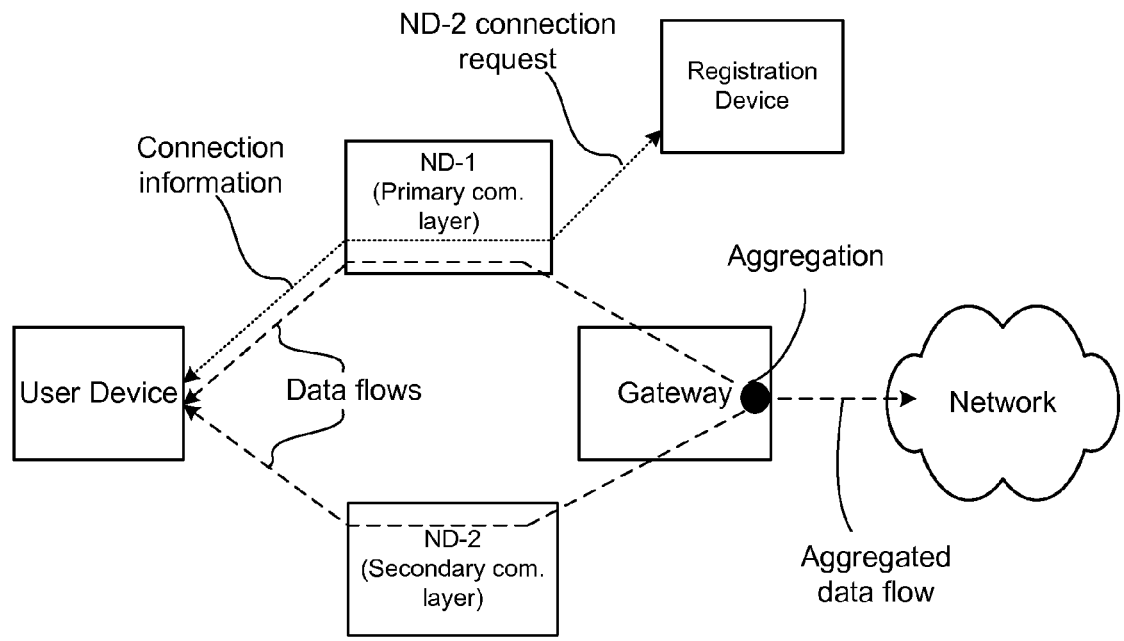
FIG. 1 illustrates an example overview of an implementation described herein.

FIG. 1 illustrates an example overview of an implementation described herein. As shown in FIG. 1, a user device may connect with a first network device (e.g., ND-1), such as a macro cell, a base station, or the like, via a primary communication layer associated with the user device. For example, the user device may connect to ND-1 based on providing ND-1 with a radio resource control (RRC) connection request and/or some other type of connection request (e.g., when the user device enters a connection range of ND-1 and when the user device is powered on). In FIG. 1, assume that that the user device is within connection range of a second network device (e.g., ND-2), such as a small cell, a micro cell, a femto cell, or the like. Further, assume that the user device detects a connection signal broadcasted by ND-2 that the user device may use to connect to ND-2. Given these assumptions, the user device may provide connection information towards a registration device.

In some implementations, the connection information may include an indication that the user device detects ND-2 and that the user device is capable of simultaneously communicating with ND-1 and ND-2 via multiple communication layers. In some implementations, ND-1 may provide a connection request to a registration device to request the registration device to establish a connection between the user device and ND-2. For example, the registration device may communicate with a gateway, connected to ND-1 and ND-2, to establish the connection between the user device and ND-2. In some implementations, the registration device, ND-1, and/or ND-2 may form protocol sets for each layer in order to establish the connection between the user device and ND-2 and to process data flows via each layer. Based on forming the protocol sets for each layer, data flows may be provided to/from the user device via multiple layers.

As a result, the user device may simultaneously communicate with ND-1 and ND-2 via multiple layers and may connect with ND-2 without disconnecting from ND-1. For example, as shown in FIG. 1, the user device may communicate with ND-1 via a primary communication layer and may communicate with ND-2 via a secondary communication layer to transmit/receive data flows. As described above, the user device may communicate with spatially separated network devices (e.g., network devices that are separated over a particular geographic distance). Additionally, or alternatively, the user device may communicate with network devices that are not spatially separated. In some implementations, a data flow provided via the primary communication layer may be processed differently than a data flow provided via the second communication layer. For example, a data flow provided via the primary communication layer, associated with ND-1, may receive a particular network resource, whereas a data flow provided via the secondary communication layer, associated with ND-2, may receive another network resource. As a result, data flows of particular classes may be transmitted via particular layers to allow the data flows to receive network resources needed for transmission without receiving additional network resources that the data flows may not need. Also, traffic may be offloaded from a macro cell type network device to a small cell type network device, thereby alleviating the macro cell type network device.

For data flows provided by the user device, the gateway may aggregate data flows, provided via multiple layers, and provide an aggregated data flow. For data flows provided to the user device, the gateway may identify particular layers with which to provide the data flows and may provide the data flows via the particular layers (e.g., based on classes associated with the data flows). In some implementations, the user device may aggregate the data flows received via multiple layers.

While the systems and/or methods are described in terms of a user device simultaneously communicating via two network devices, in practice, the systems and/or methods are not so limited. For example, the systems and/or methods may permit a user device to simultaneously communicate via any quantity of network devices (e.g., when the user device includes hardware to support the simultaneous connections).

Figure 2:
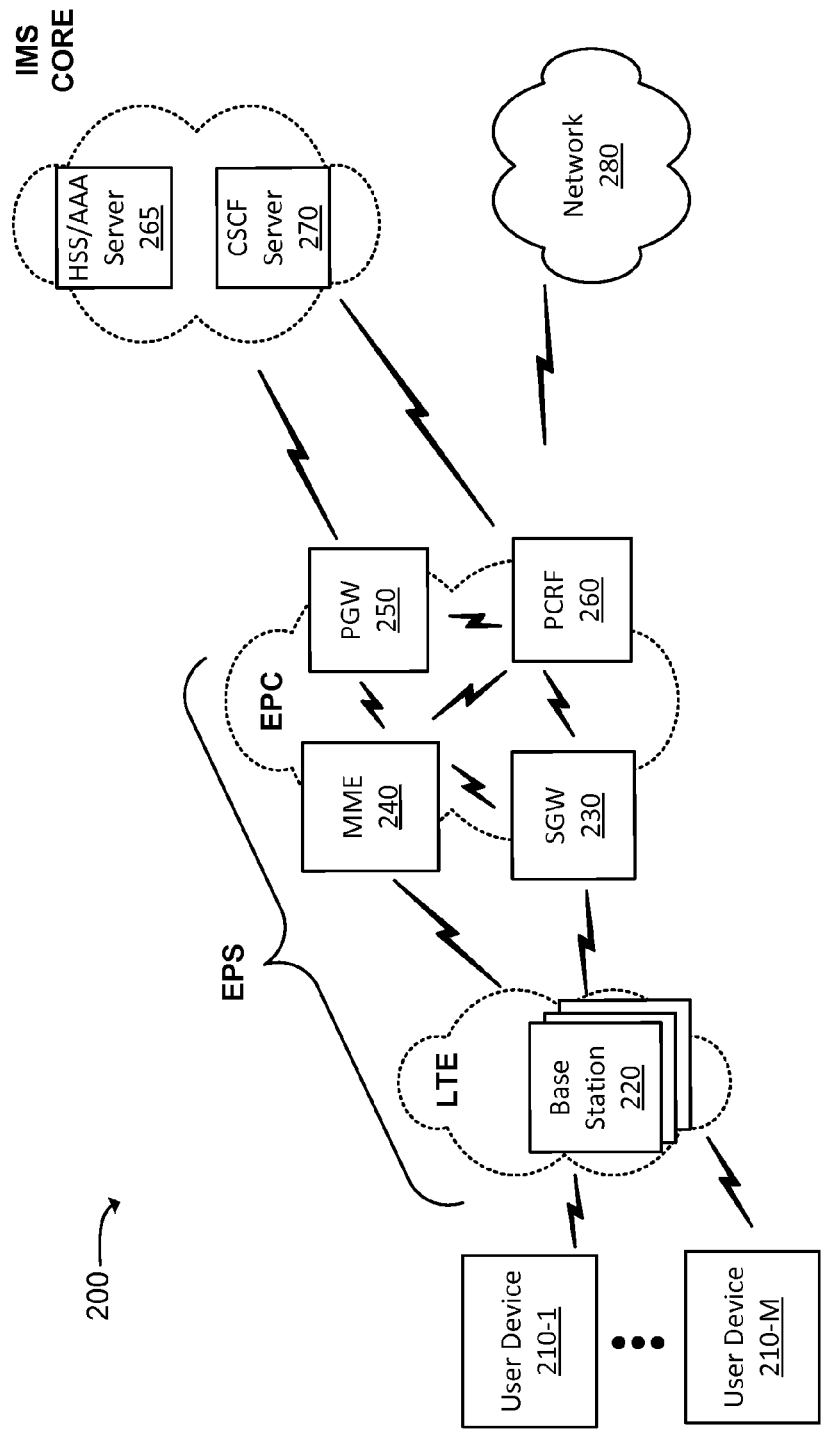
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210, . . . , 210-M (where M>1), base stations 220, serving gateway 230 (referred to as "SGW 230"), mobility management entity device 240 (referred to as "MME 240"), packet data network (PDN) gateway (PGW) 250 (referred to as "PGW 250"), policy charging rules function (PCRF) 260 (referred to as "PCRF 260"), home subscriber server (HSS)/authentication, authorization, accounting (AAA) server 265 (referred to as "HSS/AAA server 265"), call service control function (CSCF) server 270 (referred to as "CSCF server 270"), and network 280.

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, PGW 250, and/or PCRF 260 and may enable user device 210 to communicate with network 280 and/or an Internet protocol (IP) multimedia subsystem (IMS) core. The IMS core may include HSS/AAA server 265 and/or CSCF server 270, and may manage authentication, connection initiation, account information, a user profile, etc. associated with user device 210. As shown in FIG. 2, the LTE network may include base station 220.

User device 210 may include any computation or communication device, such as a wireless mobile communication device that is capable of communicating with base station 220 and/or a network (e.g., network 280). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from network 280.

Base station 220 may include one or more network devices that receive, process, and/or transmit traffic, such as audio, video, text, and/or other data, destined for and/or received from user device 210. In some implementations, base station 220 may be an eNB device and may be part of the LTE network. Additionally, or alternatively, base station 220 may be associated with a macro cell, a micro cell, a femto cell, a small cell, or the like. Base station 220 may receive traffic from and/or send traffic to network 280 via SGW 230 and PGW 250. Base station 220 may send traffic to and/or receive traffic from user device 210 via an air interface. One or more of base stations 220 may be associated with a RAN, such as the LTE network. In some implementations, base station 220 may include a primary service base station 220 to serve as an anchor layer to support an activation of a secondary communication layer on a secondary service base station 220.

In some implementations, base station 220 may include a protocol set to transmit a data flow. In some implementations, the protocol set may include a packet data convergence protocol (PDCP), a radio link control (RLC) protocol, a media access control (MAC) protocol, a general packet radio service (GPRS) tunneling protocol (GTP), a user datagram protocol (UDP)/IP protocol, and/or some other type of protocol to process a data flow received via a physical layer of base station 220.

SGW 230 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-eNB handovers, and may act as an anchor for mobility between LTE and other 3GPP technologies.

MME 240 may include one or more network devices that perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. For example, MME 240 may communicate connection information and/or connection requests to user device 210, base stations 220, and/or SGW 230 to direct user device 210, svs 220, and/or SGW 230 to form protocol sets in order to establish a connection between user device 210 and multiple base stations 220. In some implementations, MME 240 may perform policing operations for traffic destined for and/or received from user device 210. MME 240 may authenticate user device 210 (e.g., via interaction with HSS/AAA server 265).

PGW 250 may include one or more network devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

PCRF 260 may include one or more network devices, that may store subscriber information, such as voice call and data rate plans or quotas for subscribers. PCRF 260 may provide network control regarding service data flow detection, gating, (Quality of Service) QoS, and/or flow based charging. Policies and rules regarding QoS may include policies and rules instructing user device 210 and/or network devices (e.g., base station 220, SGW 230, MME 240, PGW 250, etc.) to minimize packet loss, to implement a packet delay budget, to provide a guaranteed bit rate (GBR), to provide a particular latency, and/or to perform other activities associated with QoS. In some implementations, the policies and rules may be based on a particular communication layer associated with user device 210. PCRF 260 may provide policies and rules to other network devices, SGW 230, MME 240, and/or PGW 250, to implement network control. PCRF 260 may determine how a certain service data flow shall be treated, and may ensure that user plane traffic mapping and QoS is in accordance with a user's profile and/or network policies.

HSS/AAA server 265 may include one or more computing devices, such as a server device or a collection of server devices. In some implementations, HSS/AAA server 265 may include a device that gathers, processes, searches, stores, and/or provides information in a manner described herein. For example, HSS/AAA server 265 may manage, update, and/or store, in a memory associated with HSS/AAA server 265, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 265 may include a device that performs authentication, authorization, and/or accounting (AAA) operations associated with a communication connection with user device 210.

CSCF server 270 may include one or more computing devices, such as a server device or a collection of server devices. In some implementations, CSCF server 270 may include a device that gathers, processes, searches, stores, and/or provides information in a manner described herein. CSCF server 270 may process and/or route calls to and from user device 210 via the EPC. For example, CSCF server 270 may process calls, received from network 280, that are destined for user device 210. In another example, CSCF server 260 may process calls, received from user device 210, that are destined for network 280.

Network 280 may include one or more wired and/or wireless networks. For example, network 280 may include a cellular network, a public land mobile network (PLMN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
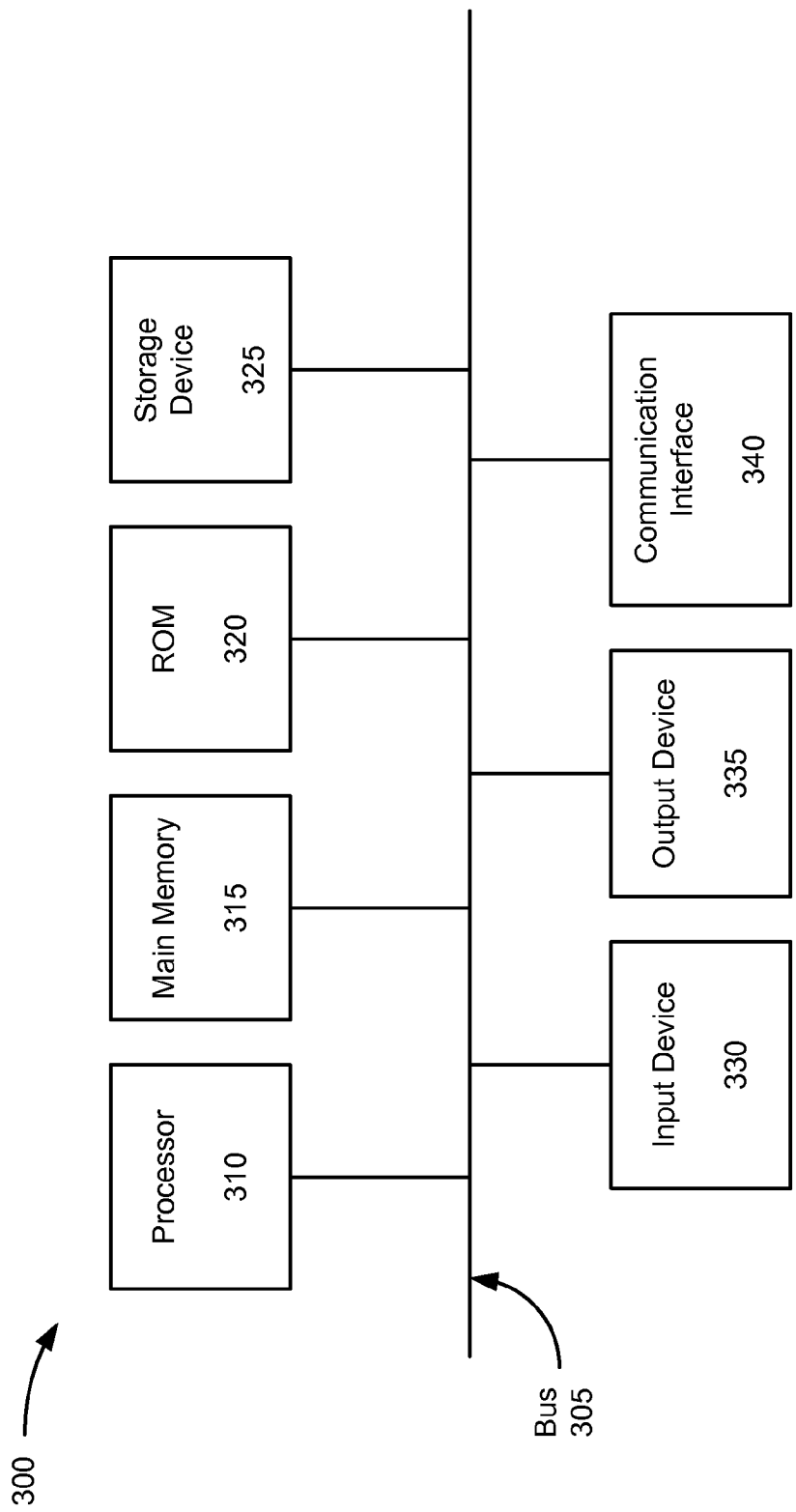
FIG. 3 illustrates example components of a device that may be used within the environment of FIG. 2.

FIG. 3 illustrates example components of a device 300 that may be used within environment 200 of FIG. 2. Device 300 may correspond to user device 210, base station 220, SGW 230, MME 240, PGW 250, PCRF 260, HSS/AAA server 265, and/or CSCF server 270. Each of user device 210, base station 220, SGW 230, MME 240, PGW 250, PCRF 260, HSS/AAA server 265, and/or CSCF server 270 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
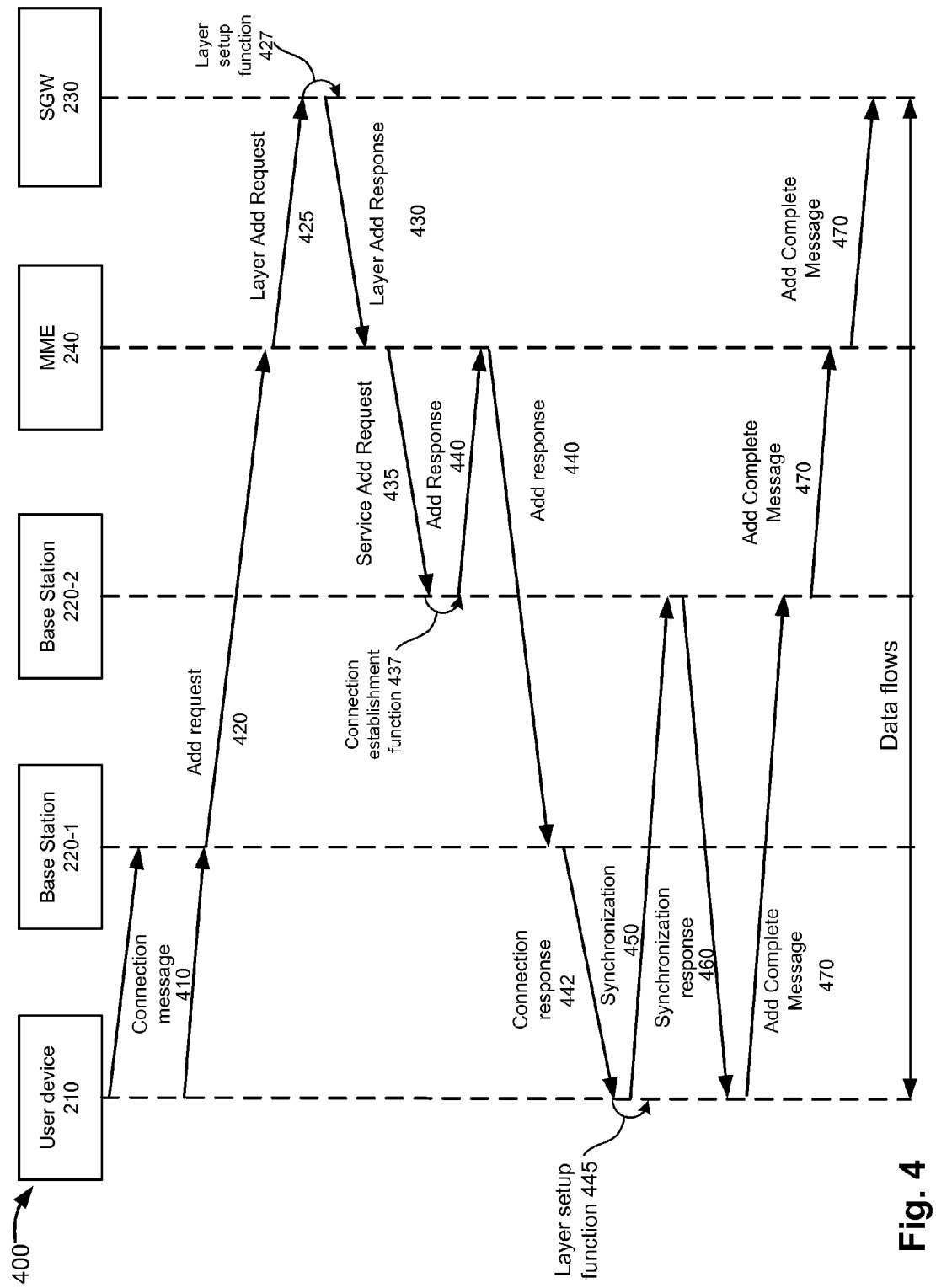
FIG. 4 illustrates a call flow diagram of example operations capable of being performed by an example portion of the environment of FIG. 2.

FIG. 4 illustrates a call flow diagram of example operations capable of being performed by an example portion 400 of environment 200. As shown in FIG. 4, portion 400 may include user device 210, base station 220-1, base station 220-2, SGW 230, and MME 240. User device 210, base station 220-1, base station 220-2, SGW 230, and MME 240 may include components and/or perform functions described above in connection with, for example, one or more of FIGS. 1-3. FIG. 4 may correspond to example operations to simultaneously connect user device 210 to multiple network devices (e.g., base station 220-1 and base station 220-2).

In FIG. 4, assume that base station 220-1 is a primary service network device (e.g., a macro cell type base station, an eNB type base station, and/or some other type of base station) that acts as an anchor to establish simultaneous connections with user device 210 and to provide data flows to/from user device 210 via a primary communication layer. Further, assume that user device 210 is connected to base station 220-1, for example, when user device 210 enters a connection range of base station 220-1 and when user device 210 is powered on. Further, assume that user device 210 is within connection range of base station 220-2 (e.g., a secondary service network device associated with a secondary communication layer) and that user device 210 is capable of simultaneously connecting to base station 220-1 and base station 220-2.

As shown in FIG. 4, user device 210 may provide connection message 410 to base station 220-1. For example, user device 210 may provide connection message 410 when user device 210 enters a connection range of base station 220-2 and when user device 210 detects base station 220-2 (e.g., based on a connection signal broadcasted by base station 220-2). In some implementations, connection message 410 may include an indication that user device 210 is capable of connecting simultaneously with multiple network devices and that user device 210 detects multiple network devices. Further, connection message 410 may include a request to connect to one or more of the multiple network devices. Additionally, or alternatively, user device 210 may send a message separate from connection message 410 to indicate that user device 210 is capable of connecting simultaneously with multiple network devices and that user device 210 detects multiple network devices.

In the example of FIG. 4, assume that connection message 410 includes an indication that user device 210 is capable of connecting simultaneously with multiple network devices and that user device 210 detects base station 220-2. Further, assume that connection message 410 includes a request for user device 210 to connect to base station 220-2 (e.g., to establish a connection to base station 220-2 to transmit/receive data flows via a secondary communication layer associated with base station 220-2 and to alleviate base station 220-1).

In some implementations, connection message 410 may include information identifying base station 220-2 (e.g., an identifier of base station 220-2, a media access control (MAC) address of base station 220-2, a network name of base station 220-2, etc.) and/or information identifying user device 210 (e.g., a user device ID, a telephone number, an integrated circuit card ID (ICCID), an international mobile equipment identifier (IMEI), and/or some other type of identifier of user device 210). In some implementations, connection message 410 may include measurement information that identifies a signal strength measurement of base station 220-2. For example, connection message 410 may include a reference signal received power (RSRP) measurement, a reference signal received quality (RSRQ) measurement, and/or some other type of measurement associated with base station 220-2.

In some implementations, base station 220-1 may receive connection message 410 from user device 210 and may generate add request 420 based on receiving connection message 410. In some implementations, add request 420 may include a request to establish a connection between user device 210 and base station 220-2. In some implementations, add request 420 may include the identifier of base station 220-2 and/or user device 210 (e.g., based on information included in connection message 410).

As shown in FIG. 4, MME 240 may receive add request 420 and may authorize user device 210 to connect with base station 220-2. For example, MME 240 may authorize user device 210 to connect with base station 220-2 based on subscription information associated with user device 210 (e.g., based on information stored by HSS/AAA server 265) and/or policy information that identifies whether user device 210 may connect with base station 220-2. For example, particular user devices 210 may only be authorized to connect with particular base stations 220 based on a subscription level of the particular user device 210. Additionally, or alternatively, MME 240 may authorize user device 210 to connect with base station 220-2 based on measurement information associated with base station 220-2 and/or based on authorization information provided by a secondary service layer admission control algorithm. For example, MME 240 may authorize user device 210 to connect with base station 220-2 when a signal strength measurement of base station 220-2 satisfies a particular threshold. Based on authorizing user device 210 to connect with base station 220-2, MME 240 may form layer add request 425 and provide layer add request 425 to SGW 230. In some implementations, layer add request 425 may include information identifying user device 210 and/or base station 220-2.

In some implementations, SGW 230 may receive layer add request 425 and may perform layer setup function 427. For example, SGW 230 may generate an instruction that directs SGW 230 to provide a data flow to/from user device 210 via a secondary communication layer (e.g., a communication layer that is to be added for user device 210 when user device 210 connects with base station 220-2). In some implementations, SGW 230 may add a secondary tunnel (e.g., a protocol set) corresponding to the secondary communication layer (e.g. in preparation for when data flows are provided to/from user device 210 via the secondary communication layer, such as when a connection is established between user device 210 and base station 220-2, as described in greater detail below). In some implementations, SGW 230 may form a primary tunnel associated with the primary communication layer. Thus, SGW 230, based on performing layer setup function 427, may form a primary tunnel (e.g., to receive data flows provided via the primary communication layer) and a secondary tunnel (e.g., to receive data flows provided via the secondary communication layer). In some implementations, the primary and secondary tunnels may each use a GTP protocol, a UDP/IP protocol, and/or some other protocol.

In some implementations (e.g., based on performing layer set up function 427), SGW 230 may generate an instruction to aggregate data flows when the data flows are received, from user device 210, via multiple communication layers associated with multiple base stations 220 (e.g., in preparation for when user device 210 provides data flows via multiple communication layers). Additionally, or alternatively, SGW 230 may generate an instruction to provide data flows towards user device 210 via particular communication layers (e.g., in preparation for when user device 210 is to receive data flows via multiple communication layers, e.g., via base station 220-1 and base station 220-2).

In some implementations, SGW 230 may form layer add response 430 based on performing layer setup function 427. In some implementations, layer add response 430 may include an indication that a tunnel has been added corresponding to the secondary communication layer and that SGW 230 is prepared to provide a data flow to/from user device 210 via multiple communication layers associated with base station 220-1 and base station 220-2. In some implementations, MME 240 may receive layer add response 430 and may form service add request 435 to base station 220-2 based on receiving layer add response 430. In some implementations, MME 240 may provide service add request 435 to base station 220-2 to direct base station 220-2 for establish a connection with user device 210. In some implementations, base station 220-2 may perform connection establishment function 437 to authorize user device 210 to connect to base station 220-2.

In some implementations, base station 220-2 may authorize user device 210 based on a device ID list stored by base station 220-2 (e.g., a list that base station 220-2 may use to authorize user device 210 to connect to base station 220-2 based on an ID of user device 210) and/or based on authorization information provided by a secondary service layer admission control algorithm. In some implementations, the device ID list may be predetermined based on subscription information associated with user device 210. Additionally, or alternatively, base station 220-2 may authorize user device 210 based on some other technique.

In some implementations, base station 220-2 may provide add response 440 based on performing connection establish function 437 and based on authorizing user device 210. In some implementations, add response 440 may include a message having information identifying that base station 220-2 is prepared to establish a connection with user device 210 and prepared to provide data flows to/from user device 210. Additionally, or alternatively, add response 440 may include information that identifies services that base station 220-2 may provide to data flows provided to/from user device 210 (e.g., QoS information, quality control index (QCI) information, etc.). In some implementations, base station 220-1 may receive add response 440 (e.g., via MME 240) and may provide connection response 442 to user device 210. In some implementations, connection response 442 may correspond to add response 440 and may identify that base station 220-2 is prepared to establish a connection with user device 210 and prepared to provide data flows to/from user device 210.

In some implementations, user device 210 may perform layer add function 445 based on receiving connection response 442. In some implementations, user device 210 may perform layer add function 445 in preparation for when user device 210 is to provide data flows via particular layers when user device 210 connects with base station 220-2. For example, user device 210 may generate an instruction that directs user device 210 to provide a data flow via a secondary communication layer (e.g., based on the type of data flow, a particular application of user device 210 via which the data flow is provided, etc.). In some implementations, user device 210 may generate a secondary protocol set used to process data flows via a layer associated with base station 220-2 (e.g., the secondary communication layer).

In some implementations, user device 210 may include a primary protocol set associated with the primary communication layer. Thus, user device 210, based on performing layer setup function 445, may include a primary protocol set (e.g., to transmit/receive data flows via the primary communication layer) and a secondary protocol set (e.g., to transmit/receive data flows via the secondary communication layer). In some implementations, the primary and secondary protocol sets may include a PDCP protocol, an RLC protocol, a MAC protocol, and/or some other type of protocol to process a data flow.

In some implementations, user device 210 may provide synchronization message 450 to base station 220-2 based on performing layer add function 445 (e.g., to synchronize communication timings with base station 220-2 in order to establish a connection with base station 220-2). For example user device 210 may transmit synchronization message 450 via a packet random access channel (PRACH) and/or some other type of channel. In some implementations, synchronization message 450 may be transmitted via the secondary communication layer (e.g., using the protocol set added for the secondary communication layer). As shown in FIG. 4, base station 220-2 may provide synchronization response 460 to user device 210 in order to complete the synchronize communication timings and to establish a connection with user device 210.

In some implementations, user device 210 may form add complete message 470 (e.g., based on receiving synchronization response 460 and establishing the connection with base station 220-2) and may provide add complete message to base station 220-2. In some implementations, add complete message 470 may include an indication that user device 210 is connected with base station 220-2 and that data flows, provided to/from user device 210, are to be transmitted via particular communication layers. As further shown in FIG. 4, base station 220-2 may provide add complete message 470 to SGW 230 (e.g., via MME 240). In some implementations (e.g., based on receiving add complete message 470), SGW 230 may provide data flows to/from user device 210 via particular communication layers. For example, SGW 230 may store information, included in add complete message 470, that identifies a particular layer to use for a particular data flow based on the class of the particular data flow.

As described in greater detail below with respect to FIGS. 5-7, SGW 230 may receive data flows from user device 210 (e.g., via primary and secondary communication layers) and may aggregate the data flows for transmission to network 280. Additionally, or alternatively, SGW 230 may receive data flows destined for user device 210 and may provide the data flows to user device 210 via the primary and secondary communication layers (e.g., based on header information that identifies the types of data flows and based on information stored by SGW 230 that identifies a particular layer to provide a particular data flow based on the type of data flow).

While a particular series of operations and/or data flows have been described above with regards to FIG. 4, the order of the operations and/or data flows may be modified in other implementations. Further, non-dependent operations may be performed in parallel. For example, base station 220-1 may provide add request 420 via base station 220-2 or directly to MME 240 as shown in FIG. 4. In some implementations, MME 240 may provide add response 440 to base station 220-1 via base station 220-2 or directly to base station 220-1 as shown in FIG. 4.

Also, while establishing a connection between user device and two base stations 220 is described in FIG. 4, in practice, a connection between user device 210 and any quantity/type of network devices may be established in accordance with the operations described above.

While a single SGW 230 and a single MME 240 are shown in FIG. 4, in practice, any number of SGWs 230 and/or MMEs 240 may be involved. For example, when base station 220-1 and base station 220-2 connect with different SGWs 230 and/or MMEs 240, data flows, messages, requests, etc. provided via different SGWs 230 and/or MMEs 240 may be transmitted via a handover process (e.g., an S1 handover process and/or some other handover process).

In some implementations, an MME 240, associated with base station 220-1 (e.g., MME 240-1), may contact an MME 240 associated with base station 220-2 (e.g., MME 240-2) to provide layer add request 425 to SGW 230. In some implementations (e.g., when base station 220-1 and base station 220-2 connect to a common MME 240 and connect to different SGWs 230), MME 240 may provide layer add request to the SGW 230 connected to base station 220-2.

Figure 5:
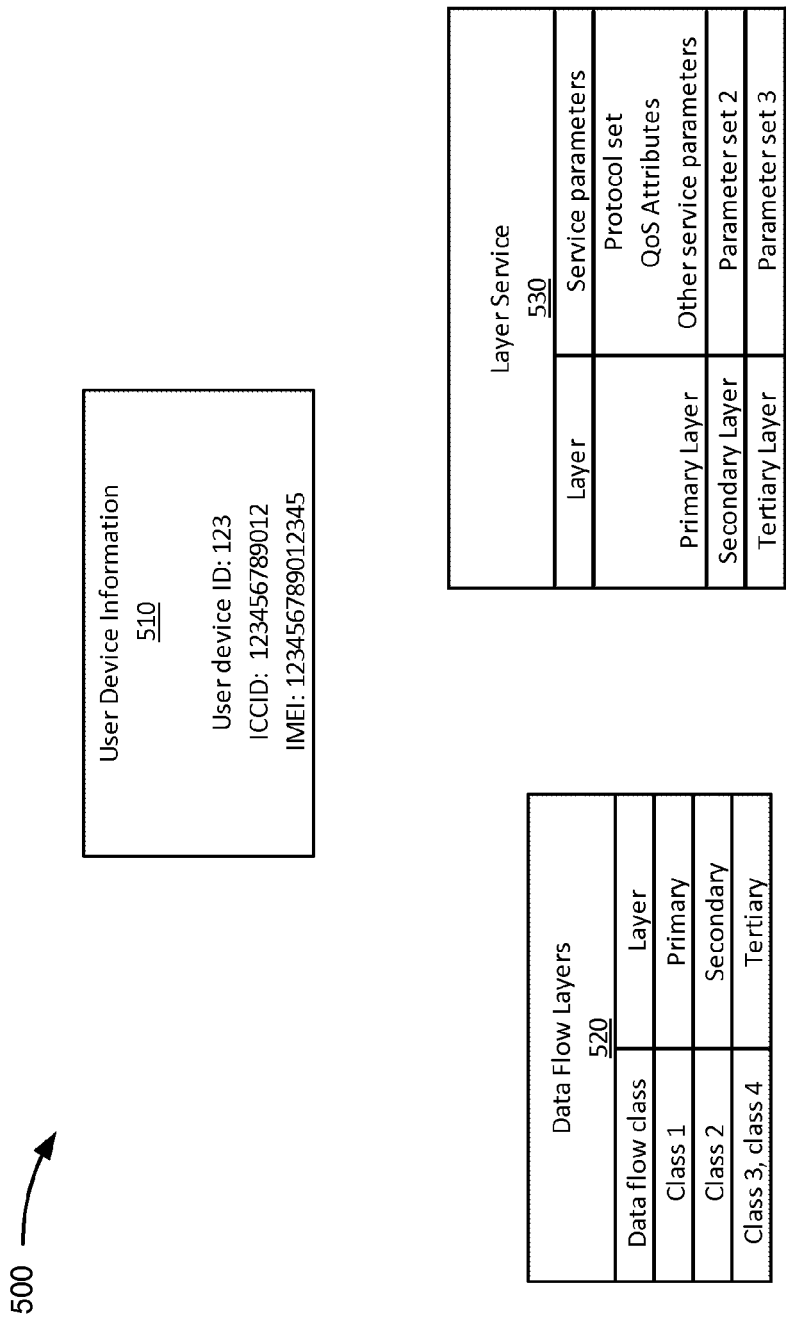
FIG. 5 illustrates an example data structure that may be stored by one or more devices in the environment of FIG. 2.

FIG. 5 illustrates an example data structure 500 that may be stored by one or more devices in environment 200, such as user device 210 and/or SGW 230. In some implementations, data structure 500 may be stored in a memory of user device 210 and/or SGW 230. In some implementations, data structure 500 may be stored in a memory separate from, but accessible by, user device 210 and/or SGW 230. In some implementations, data structure 500 may be stored by some other device in environment 200, such as base station 220, MME 240, PGW 250, PCRF 260, HSS/AAA server 265, and/or CSCF server 270.

A particular instance of data structure 500 may contain different information and/or fields than another instance of data structure 500. One instance of data structure 500 may store information identifying service parameters for one user device 210 in environment 200, whereas another instance of data structure 500 may store information identifying service parameters of another user device 210 in environment 200.

As shown in FIG. 5, data structure 500 may include user device information field 510, data flow layers field 520, and layer service field 530.

User device information field 510 may store information identifying a particular user device 210 associated with data structure 500. For example, user device information field 510 may store a user device identifier (ID), an integrated circuit card ID (ICCID), an international mobile equipment identifier (IMEI), and/or some other information to uniquely identify user device 210 (e.g., a telephone number, a subscriber identity module (SIM) card number, etc.).

Data flow layers field 520 may store information identifying communication layers via which a data flow, of a particular class, is to be transmitted. For example, data flow layers field 520 may store information to identify that a class 1 data flow is to be transmitted via a primary communication layer, a class 2 data flow is to be transmitted via a secondary communication layer, a class 3 data flow is to be transmitted via a tertiary communication layer, etc. In some implementations, data flow layers field 520 may correspond to a communication layer selection function of user device 210 and/or SGW 230. For example, user device 210 may select a layer via which to provide a data flow based on information stored by data flow layers field 520 (e.g., based on a class of the data flow and/or based on an application, on user device 210, associated with the data flow).

Additionally, or alternatively, SGW 230 may provide a particular data flow to user device 210 via a particular communication layer based on the class of the particular data flow and based on information stored by data flow layers field 520. For example, SGW 230 may receive user device information when providing a data flow to user device 210 (e.g., via a session between user device 210 and SGW 230). In some implementations, SGW 230 may identify a particular data structure 500 associated with user device 210 (e.g., based on the user device information and based on information stored by user device information field 510). Once the particular data structure 500 is identified, SGW 230 may provide the data flow to user device 210 via a particular communication layer (e.g., based on the class of the data flow and based on information stored by data flow layers field 520). As described below, the particular communication layer may be associated with a particular set of service parameters that identify how the data flow is to be treated.

In some implementations, data flow layers field 520 may store information for active communication layers associated with user device 210. For example, at a particular instance in time, user device 210 may include a single communication layer to transmit data flows of multiple classes. At another instance in time, user device 210 may include multiple communication layers (e.g., when user device 210 establishes a connection with multiple base stations 220 in accordance with operations described with respect to FIG. 4) with each communication layer being used to transmit a particular class of data flows. For example, SGW 230 may store, in data flow layers field 520, information identifying a secondary communication layer when performing layer setup function 427 (e.g., in preparation for when user device 210 provides a data flow via the secondary communication layer). Additionally, or alternatively, user device 210 may store, in data flow layers field 520, information identifying a secondary communication layer when performing layer setup function 445.

In some implementations, information stored by data flow layers field 520 may be updated dynamically, for example, when user device 210 connects/disconnects with different base stations 220. As described above, SGW 230 and/or user device 210 may store information in data flow layers field 520 based on performing layer setup function 427 and/or layer setup function 445 (e.g., when user device 210 is to simultaneously connect with multiple base stations 220).

For example, given the assumption that user device 210 connects with a particular base station 220 associated with a primary communication layer, data flow layers field 520 may be updated when user device 210 connects with another base station 220 (e.g., a base station 220 associated with a secondary communication layer). Further, information identifying data flows, of particular classes, transmitted via particular communication layers may be updated as user device 210 connects/disconnects with different base stations 220. For example, assume that at a particular point in time, user device 210 includes primary and secondary communication layers (e.g., when connecting with two base stations 220). Given this assumption, data flow layers field 520 may store information to identify that data flows of classes 1 and 2 are to be transmitted via the primary communication layer and that data flows of classes 3 and 4 are to be transmitted via the secondary communication layer. Assume that at a later point in time, user device 210 includes primary, secondary, and tertiary communication layers (e.g., when user device 210 connects with a third base station 220). Given this assumption, data flow layers field 520 may be updated to reflect that data flows of class 1 are to be transmitted via the primary communication layer, that data flows of class 2 are to be transmitted via the secondary communication layer, and that data flows of classes 3 and 4 are to be transmitted via the tertiary communication layer. In practice, other examples of dynamic updates to data flow layers field 520 are possible than what is described above.

In some implementations, a particular data flow of a particular class may be transmitted via a particular communication layer based on services provided by a corresponding base station 220 associated with the particular communication layer. For example, a particular base station 220 may provide services (e.g., network resources, such as a bearer providing a particular QoS, a particular GBR, a particular latency, etc.) to a particular class of data flow. As an example, a class 1 data flow, such as a data flow associated with video data, may be transmitted via a communication layer associated with a particular base station 220 that may provide a particular service (e.g., a particular network resource) to the class 1 data flow (e.g., such that the class 1 data flow receives the network resource needed for transmission).

Layer service field 530 may store information identifying service parameters associated with particular communication layers. For example, a primary communication layer may include particular service parameters, such as a particular set of protocols to transmit a data flow, a particular set of QoS attributes to provide to the data flow (e.g., a particular GBR, latency, jitter, etc.), and/or some other information that identifies how the data flow is to be treated when transmitted via the primary communication layer. In some implementations, service parameters for particular layers may be predetermined and may be based on services capable of being provided by particular base stations 220.

Because data flows of particular classes, that may be provided via particular communication layers, may be associated with particular service parameters, network resources may be provided to the data flows based on data flow classes to allow the data flows to receive network resources needed for transmission without receiving additional network resources that the data flows may not need.

In some implementations, PGW 250 may access information stored by data structure 500 to enforce the service parameters. For example, PGW 250 may communicate with SGW 230 to cause SGW 230 to provide data flows, transmitted via particular communication layers, with particular services (e.g., network resources).

While particular fields are shown in a particular format in data structure 500, in practice, data structure 500 may include additional fields, fewer fields, different fields, or differently arranged fields than are shown in FIG. 5. Also, FIG. 5 illustrates examples of information stored by data structure 500. In practice, other examples of information stored by data structure 500 are possible.

Figure 6:
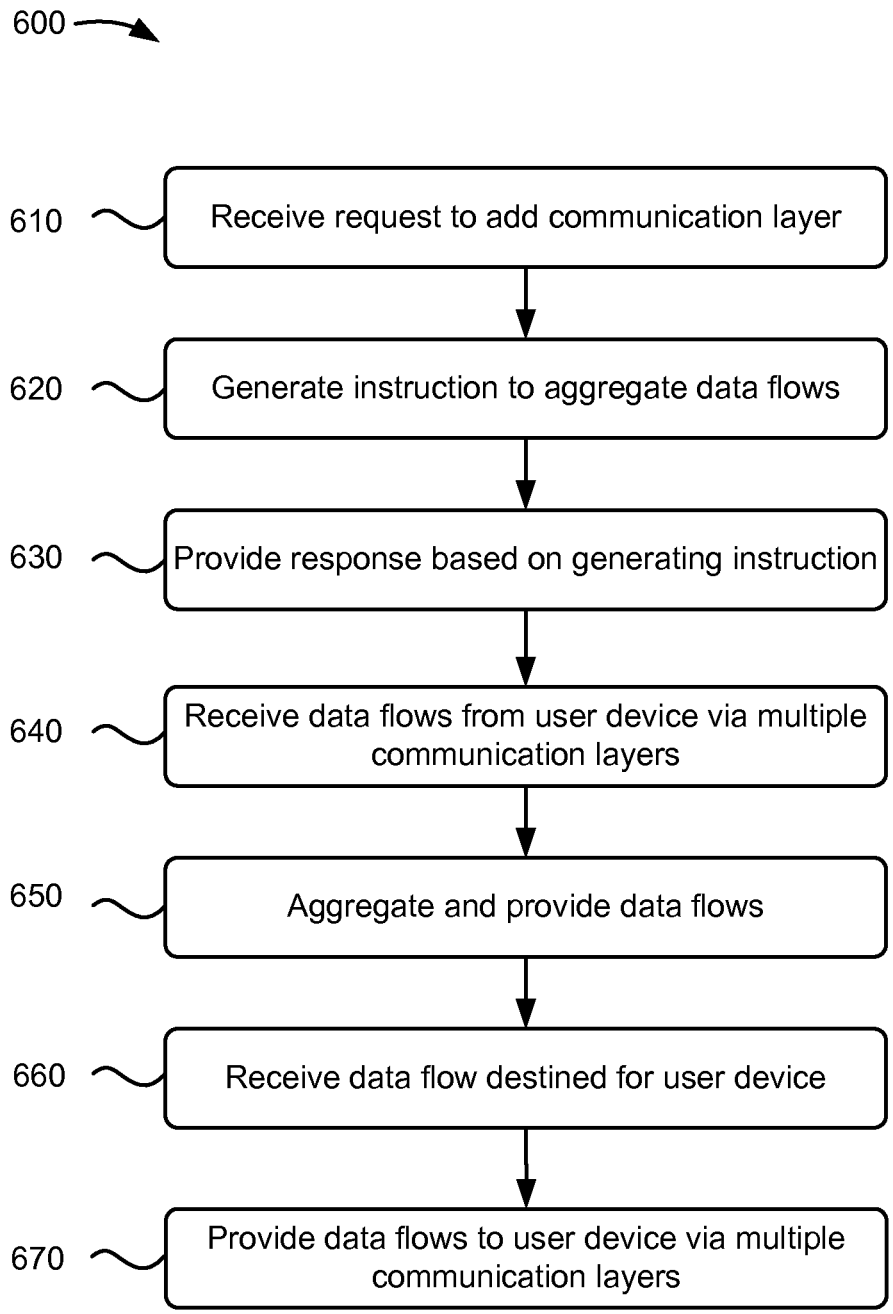
FIG. 6 illustrates a flowchart of an example process for providing data flows to and from a user device via multiple communication layers.

FIG. 6 illustrates a flowchart of an example process 600 for providing data flows to and from a user device via multiple communication layers. In one implementation, process 600 may be performed by one or more components of SGW 230. In another implementation, some or all of blocks of process 600 may be performed by one or more components of another device in environment 200 (e.g., MME 240, PGW 250, and/or PCRF 260), or a group of devices including or excluding SGW 230. In FIG. 6, assume that user device 210 is connected to base station 220-1 via a primary communication layer.

As shown in FIG. 6, process 600 may include receiving a request to add a communication layer (block 610). For example, as described above with respect to layer add request 425, SGW 230 may receive the request to add the communication layer from MME 240. In some implementations, MME 240 may provide the request to add the communication layer based on receiving the request to add the communication layer from user device 210 (e.g., via base station 220-1). In some implementations, user device 210 may provide the request to add the communication layer when user device 210 detects base station 220-2 and when user device 210 is capable of simultaneously communicating via base station 220-1 and base station 220-2.

Process 600 may also include generating an instruction to aggregate data flows (block 620). For example, as described above with respect to layer setup function 427, SGW 230 may generate an instruction that directs SGW 230 to provide a data flow to/from user device 210 via a secondary communication layer (e.g., the communication layer that is to be added for user device 210 when user device 210 connects with base station 220-2). In some implementations, SGW 230 may add a secondary tunnel corresponding to the secondary communication layer (e.g., in preparation for when data flows are provided to/from user device 210 via the secondary communication layer, such as when a connection is established between user device 210 and base station 220-2).

Process 600 may further include providing a response based on generating the instruction (block 630). For example, as described above with respect to layer add response 430, SGW 230 may provide the response to indicate that a tunnel has been added corresponding to the secondary communication layer and that SGW 230 is prepared to provide a data flow to/from user device 210 via multiple communication layers associated with base station 220-1 and base station 220-2.

Process 600 may also include receiving data flows from the user device via multiple communication layers (block 640). For example, SGW 230 may receive the data flows via the primary communication layer and via the secondary communication layer when user device 210 simultaneously connects with base station 220-1 and base station 220-2. In some implementations, SGW 230 may receive data flows via a primary tunnel for data flows provided via the primary communication layer. In some implementations, SGW 230 may receive data flows via a secondary tunnel for data flows provided via the secondary communication layer. In some implementations, the data flows may be associated with a common destination (e.g., based on an IP address of the data flows).

Process 600 may further include aggregating and providing the data flows (block 650). For example, SGW 230 may aggregate the data flows from the primary tunnel and the secondary tunnel to form an aggregated data flow. In some implementations, SGW 230 may provide the aggregated data flow toward a destination (e.g., based on an IP address associated with the aggregated data flow).

Process 600 may also include receiving data flows destined for the user device (block 660). For example, SGW 230 may receive a data flow destined for user device 210 (e.g., from an origin device). In some implementations, the data flow may identify user device 210 based on an IP address associated with the data flow and with user device 210 and/or based on some other information included in the data flow that identifies user device 210.

Process 600 may further include providing the data flows to the user device via multiple communication layers (block 670). For example, SGW 230 may identify information regarding user device 210 (e.g., based on session information for a session between user device 210 and SGW 230), and identify classes of the data flows (e.g., based on headers in packets of the data flows and/or based on other information that identifies the classes of the data flows). Based on the information identifying user device 210, the information identifying the classes of the data flows, and information stored by data flow layers field 520, SGW 230 may perform a communication layer selection function to select communication layers via which to provide the data flows towards user device 210. For example, SGW 230 may provide class 1 and class 2 data flows via the primary communication layer (e.g., via the primary tunnel) and may provide class 3 and class 4 data flows via the secondary communication layer (e.g., via the secondary tunnel) towards user device 210.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel. Also, in some implementations, some of the blocks may be omitted. While process 600 describes an example implementation providing data flows to and from user device 210 via primary and secondary communication layers, in practice, process 600 may apply to providing data flows to and from user device 210 via any number of communication layers.

Figure 7:
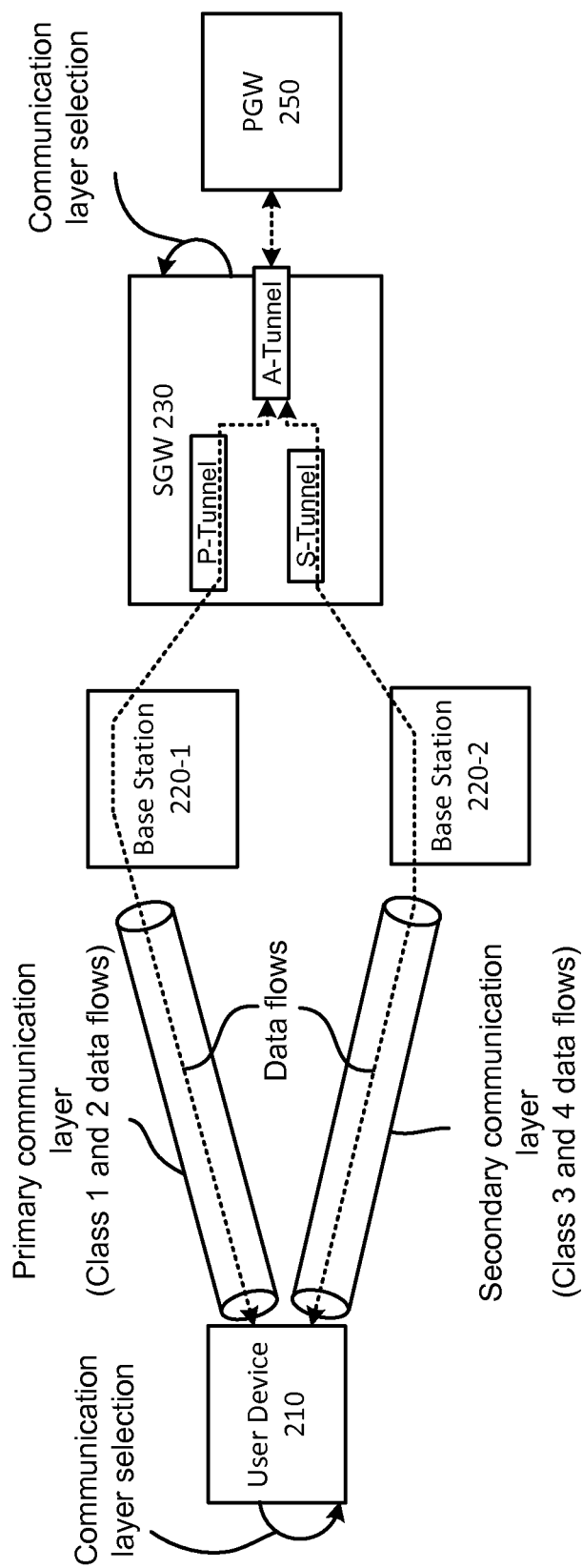
FIG. 7 illustrates an example implementation as described herein.

FIG. 7 illustrates an example implementation as described herein. In FIG. 7, assume that user device 210 connects with base station 220-1 via a primary communication layer and to base station 220-2 via a secondary communication layer (e.g., in accordance with operations described above with respect to FIG. 4). Further, assume that SGW 230 generates a primary tunnel (e.g., to transmit data flows via the primary communication layer) and a secondary tunnel (e.g., to transmit data flows via the secondary communication layer), in accordance with operations described above with respect to FIG. 4. Further, assume that class 1 and class 2 data flows are to be transmitted via the primary communication layer and that class 3 and class 4 data flows are to be transmitted via the secondary communication layer (e.g., based on information stored by data flow layers field 520). Further, assume that PGW 250 enforces service parameters/policies associated with the primary communication layer and second communication layer. Given these assumptions, and as shown in FIG. 7, user device 210 may provide class 1 and class 2 data flows via the primary communication layer and provide class 3 and class 4 data flows via the secondary communication layer.

In some implementations, user device 210 may perform a communication layer selection function to identify data flows that are to be provided via the primary communication layer and data flows that are to be provided via the secondary communication layer. For example, user device 210 may identify a class of the data flows based on an application associated with the data flows, based on header information of data packets associated with the data flows that identifies the class of data flows, and/or based on some other information that identifies the class of the data flows.

In some implementations (e.g., based on the information identifying the classes of the data flows and based on information stored by data flow layers field 520), user device 210 may select a particular layer via which to provide the data flows. For example, user device 210 may select to transmit class 3 and class 4 data flows via the primary communication layer (e.g., a communication layer associated with base station 220-1). Further, user device 210 may select to transmit class 1 and class 2 data flows via the secondary communication layer (e.g., a communication layer associated with base station 220-2). In some implementations, each communication layer may be associated with a particular protocol set implemented by user device 210. That is, user device 210 may use a first protocol set to transmit the class 1 and class 2 data flows via the primary communication layer and may use a second protocol set to transmit the class 3 and class 4 data flows via the secondary communication layer.

In some implementations, the data flows provided via the primary communication layer may be provided (e.g., via base station 220-1) to a primary tunnel (e.g., a p-tunnel) of SGW 230. The data flows provided via the secondary communication layer may be provided (e.g., via base station 220-2) to a secondary tunnel (e.g., an s-tunnel) of SGW 230. As further shown in FIG. 7, the data flows may be provided by the s-tunnel and the p-tunnel to an aggregator tunnel (e.g., an a-tunnel) of SGW 230. In some implementations, SGW 230 may combine (e.g., aggregate) the data flows via the a-tunnel and provide the aggregated data flows to PGW 250 (e.g., for transmission to network 280). For example SGW 230 may aggregate the data flows based on forming the p-tunnel, and the s-tunnel, and based on forming an instruction to aggregate data flows received via the primary and secondary communication layers (e.g., via the p-tunnel and the s-tunnel), as described above with respect to layer setup function 427.

For data flows destined for user device 210, SGW 230 may receive the data flows (e.g., via the a-tunnel), identify information regarding user device 210 (e.g., based on session information for a session between user device 210 and SGW 230), and identify classes of the data flows (e.g., based on headers in packets of the data flows and/or based on other information that identifies the classes of the data flows). Based on the information identifying user device 210, the information identifying the classes of the data flows, and information stored by data flow layers field 520, SGW 230 may perform a communication layer selection function to select communication layers via which to provide the data flows towards user device 210. For example, SGW 230 may provide class 1 and class 2 data flows via the primary communication layer (e.g., via the p-tunnel) and may provide class 3 and class 4 data flows via the secondary communication layer (e.g., via the s-tunnel) towards user device 210. In some implementations, SGW 230 may provide the data flows towards user device 210 based on generating an instruction to provide the data flows towards user device 210 via the primary and secondary communication layers (e.g., as described above with respect to layer setup function 427).

While a particular example is shown in FIG. 7, it will be apparent that the above description is merely an example implementation. Other examples are possible and may differ from what was described with regard to FIG. 7.

As described above, user device 210 may simultaneously communicate with multiple base stations 220 via multiple communication layers. Also, when user device 210 is connected with a particular base station 220 (e.g., base station 220-1), user device 210 may connect with another base station 220 (e.g., base station 220-2) without disconnecting from base station 220-1. As described above, user device 210 may communicate with spatially separated network devices (e.g., network devices that are separated over a particular geographic distance).

In some implementations, a data flow provided via the primary communication layer may be processed differently than a data flow provided via the secondary communication layer. For example, a data flow provided via the primary communication layer may receive a particular network resource, whereas a data flow provided via the secondary communication layer may receive another network resource. As a result, data flows of particular classes may be transmitted via particular layers that provide particular network resources, thereby providing network resources based on data flow classes to allow the data flows to be transmitted using network resources needed for transmission without receiving excess network resources that the may not be needed. Also, traffic may be offloaded from a macro cell type network device to a small cell type network device, thereby alleviating the load on the macro cell type network device.

In some implementations, user device 210 and/or SGW 230 may aggregate data flows across multiple duplex schemes, such as a frequency domain duplex (FDD) scheme, a time domain duplex (TDD) scheme, or the like. Additionally, or alternatively, user device 210 and/or SGW 230 may aggregate data flows provided across one or more access network types, such as a cellular access network (e.g., an LTE network and/or some other type of cellular network), LAN, a WLAN, or the like.

In some implementations, a particular communication layer may include an uplink, a downlink, or a combination of an uplink and a downlink to user device 210. As an example, assume that base station 220-1 is associated with a primary communication layer and includes an uplink and a downlink to user device 210. Further, assume that base station 220-2 is associated with a secondary communication layer and includes only a downlink to user device 210. Further, assume that base station 220-2 provides a data flow to user device 210 via the downlink. Given these assumptions, user device 210 may provide an acknowledgment towards base station 220-2 (e.g., an acknowledgement message that indicates that the data flow has been received). In some implementations, base station 220-1 may receive the acknowledgement message and provide the acknowledgement message to base station 220-2 on behalf of user device 210 (e.g., via a session between base station 220-1 and base station 220-2, such as an X2 communication session, an inter-eNB communication session, or the like).

In some implementations, multiple layers provided by multiple base stations 220 may operate on the same spectrum or on different spectrums. In some implementations (e.g., when the multiple layers operate on different spectrums), radio frequency (RF) coverage overlap (e.g., overlap as a result of the two layers operating on the same spectrum) may be supported via enhanced inter-cell inference coordination (eICIC) or supported using some other technique.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

Some implementations are described herein in conjunction with thresholds. The term "greater than" for similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

What is claimed is:

1. A method comprising:
   receiving, by one or more evolved packet core (EPC) devices, a request from a user device via a first communication layer associated with a first base station device,
      the request, received from the user device, requesting to add a second communication layer associated with a second base station device,
      the request, received from the user device, identifying the second base station device which is different than the first base station device via which the request is received;
   generating, by the one or more EPC devices and based on receiving the request, an instruction to aggregate a first data flow, to be provided from the user device via the first communication layer associated with the first base station device, and a second data flow, to be provided from the user device via the second communication layer associated with the second base station device;
   providing, by the one or more EPC devices and based on generating the instruction, a response to the second base station device identified by the request received from the user device,
      the response indicating that the one or more EPC devices are prepared to aggregate the first data flow and the second data flow,
      the response, provided by the one or more EPC devices and based on the one or more EPC devices determining to aggregate the first data flow and the second data flow, including an instruction to direct the second base station device to establish a simultaneous connection with the user device while the user device is connected to the first base station device,
      the response causing the second base station device to establish the simultaneous connection with the user device via the second communication layer;
   aggregating, by the one or more EPC devices, the first data flow, provided by the user device via the first base station device, and the second data flow, provided by the user device via the second base station device, by combining the first data flow and the second data flow into an aggregated data flow associated with a common destination,
      the first data flow and the second data flow including different data provided by the user device to the common destination; and
   providing, by the one or more EPC devices, the aggregated data flow.

2. The method of claim 1, further comprising:
   receiving the first data flow from the user device via the first communication layer and the second data flow from the user device via the second communication layer.

3. The method of claim 1, where the first communication layer and the first data flow are associated with a first data flow class and the second communication layer and the second data flow are associated with a second data flow class, the first data flow class and the second data flow class being different.

4. The method of claim 1, further comprising:
generating an instruction to provide a third data flow and a fourth data flow, destined for the user device, to the user device via the first communication layer or via the second communication layer based on a data class associated with the third data flow or the fourth data flow.

5. The method of claim 4, further comprising:
receiving the third data flow;
receiving the fourth data flow;
determining that the third data flow is associated with a first data flow class;
determining that the fourth data flow is associated with a second data flow class;
providing the third data flow to the user device via the first communication layer based on determining that the third data flow is associated with the first data flow class; and
providing the fourth data flow towards the user device via the second communication layer based on determining that the fourth data flow is associated with the second data flow class.

6. The method of claim 1, where the first communication layer and the second communication layer are associated with different service parameters,
where the first communication layer is associated with a first tunnel and where the second communication layer is associated with a second tunnel.

7. The method of claim 1, where providing the response to indicate that the one or more EPC devices are prepared to aggregate the first data flow and the second data flow causes the user device to generate an instruction to provide the first data flow and second data flow via the first or second communication layers based on data flow classes associated with the first data flow and second data flow.

8. The method of claim 1, where the first base station device and the second base station device are separated by a threshold geographic distance.

9. The method of claim 1, further comprising:
providing, by the one or more EPC devices and based on generating the instruction, a message to the user device via the first communication layer associated with the first base station device,
the message indicating that the second base station device is prepared to establish the simultaneous connection with the user device via the second communication layer.

10. The method of claim 1, where the request received from the user device via the first communication layer associated with the first base station device includes information requesting the simultaneous connection between the user device and the second base station device be established.

11. A system comprising:
one or more evolved packet core (EPC) devices, including one or more processors, configured to:
receive, from a user device via a first communication layer associated with a first base station device, a request to add a second communication layer associated with a second base station device,
the request, received from the user device, identifying the second base station device which is different than the first base station device via which the request is received,
the first and second base station devices being separated by a threshold geographic distance;
generate an instruction, based on receiving the request to add the second communication layer, to aggregate a first data flow from the user device, to be provided via the first communication layer associated with the first base station device, and a second data flow from the user device, to be provided via the second communication layer associated with the second base station device;
provide, to the second base station device identified by the request and based on generating the instruction, a response to indicate that the one or more EPC devices are prepared to aggregate the first data flow and the second data flow,
the response, provided by the one or more EPC devices and based on the one or more EPC devices determining to aggregate the first data flow and the second data flow, including an instruction to direct the second base station device to establish a simultaneous connection with the user device while the user device is connected to the first base station device,
the response causing the second base station device to establish the simultaneous connection with the user device via the second communication layer;
aggregate the first data flow, provided by the user device via the first base station device, and the second data flow, provided by the user device via the second base station device, by combining the first data flow and the second data flow into an aggregated data flow associated with a common destination,
the first data flow and the second data flow including different data provided by the user device to the common destination; and provide the aggregated data flow.

12. The system of claim 11, where the one or more EPC devices are further configured to:
receive the first data flow from the user device via the first communication layer and the second data flow from the user device via the second communication layer.

13. The system of claim 11, where the first communication layer and the first data flow are associated with a first data flow class and the second communication layer and the second data flow are associated with a second data flow class,
the first data flow class and the second data flow class being different.

14. The system of claim 11, where the one or more EPC devices are further configured to:
generate an instruction to provide a third data flow and a fourth data flow, destined for the user device, to the user device via the first communication layer or via the second communication layer based on a data class associated with the third data flow or the fourth data flow.

15. The system of claim 14, where the one or more EPC devices are further configured to:
receive the third data flow;
receive the fourth data flow;
determine that the third data flow is associated with a first data flow class;
determine that the fourth data flow is associated with a second data flow class;

provide the third data flow to the user device via the first communication layer based on determining that the third data flow is associated with the first data flow class; and provide the fourth data flow towards the user device via the second communication layer based on determining that the fourth data flow is associated with the second data flow class.

16. The system of claim 11, where when providing the response to indicate that the one or more EPC devices are prepared to aggregate the first data flow and the second data flow, the one or more EPC devices are configured to:

provide the response to cause the user device to generate an instruction to provide the first data flow and the second data flow via the first or second communication layers based on data flow classes associated with the first data flow and the second data flow.

17. A non-transitory computer-readable medium for storing instructions, the instructions comprising:

a plurality of instructions which, when executed by one or more processors associated with one or more evolved packet core (EPC) devices, cause the one or more processors to:

receive, from a user device via a first communication layer associated with a first base station device, a request to add a second communication layer associated with a second base station device, the request, received from the user device, identifying the second base station device which is different than the first base station device via which the request is received;

generate an instruction, based on receiving the request to add the second communication layer, to aggregate a first data flow, to be provided from the user device via the first communication layer associated with the first base station device, and a second data flow from the user device, to be provided via the second communication layer associated with the second base station device;

provide, to the second base station device identified by the request received from the user device and based on generating the instruction, a message to indicate that the one or more EPC devices are prepared to aggregate the first data flow and the second data flow, the message, provided by the one or more EPC devices and based on the one or more EPC devices determining to aggregate the first data flow and the second data flow, including an instruction to direct the second base station device to establish a simultaneous connection with the user device while the user device is connected to the first base station device, the message causing the second base station device to establish the simultaneous connection with the user device via the second communication layer;

receive the first data flow from the user device via the first communication layer and the second data flow from the user device via the second communication layer after providing the message;

aggregate the first data flow, provided by the user device via the first base station device, and the second data flow, provided by the user device via the second base station device, by combining the first data flow and the second data flow into an aggregated data flow associated with a common destination, the first data flow and the second data flow including different data provided by the user device to the common destination; and provide the aggregated data flow.

18. The non-transitory computer-readable medium of claim 17, where the first communication layer and the first data flow are associated with a first data flow class and the second communication layer and the second data flow are associated with a second data flow class, the first data flow class and the second data flow class being different.

19. The non-transitory computer-readable medium of claim 17, where the plurality of instructions further cause the one or more processors to:

generate an instruction to provide a third data flow and a fourth data flow to the user device via the first communication layer or via the second communication layer based on a data class associated with the third data flow or the fourth data flow.

20. The non-transitory computer-readable medium of claim 17, where the first communication layer and the second communication layer are associated with different service parameters that provide different network resources to the different data of the first data flow and the second data flow.

* * * * *